United States Patent Office 2,798,074
Patented July 2, 1957

2,798,074

1.2-DIPHENYL-3.5-DIOXO-4-[3'-(PYRIDYL-2"-MER-CAPTO)-n-PROPYL]-PYRAZOLIDINE

Rudolf Pfister and Franz Häfliger, Basel, Switzerland, assignors, by mesne assignments, to Geigy Chemical Corporation, New York, N. Y., a corporation of Delaware No Drawing. Application May 20, 1955,
Serial No. 510,032

Claims priority, application Switzerland May 22, 1954

1 Claim. (Cl. 260—294.8)

The present invention is concerned with a new, therapeutically valuable 4-substituted 1.2-diphenyl-3.5-dioxopyrazolidine derivative as well as the salts thereof with inorganic and organic bases, and with the production thereof. 1.2-Diphenyl - 4 - n - butyl - 3,5 - dioxo - py - razolidine has attained great importance as a medicament for the treatment of rheumatic complaints.

However, a compound heterocyclically substituted in the 4-position, of the formula

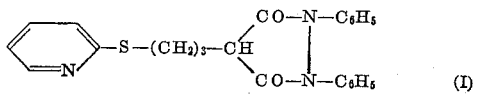
(I)

has not hitherto been known.

It has now been found that this compound has interesting therapeutical properties, in particular excellent antipyretic and antiphlogistic as well as also analgesic activity. In principle, the new compound is produced by condensation to form the ring of a reactive functional derivative corresponding to the substituted malonic acid with hydrazobenzene or an N-acyl hydrazobenzene. The production is thus characterised by condensing to form the ring, preferably in the presence of an alkaline condensation agent, a substituted malonic acid ester of the general formula:

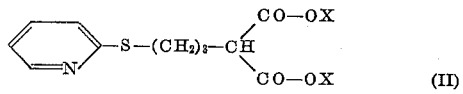
(II)

wherein X represents a lower alkyl radical with a hydrazobenzene or hydrazobenzene derivative of the general formula:

(III)

wherein Z represents hydrogen or an acyl radical which can easily be split off, or condensing to close the ring, preferably in the presence of an acid binding agent, a substituted malonic acid derivative of the general formula:

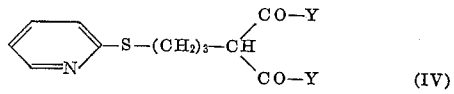
(IV)

wherein Y represents chlorine, bromine or an acyloxy radical, e. g. the acetyloxy radical, with a hydrazobenzene of the general formula:

(V)

Alkali metals or compounds thereof such as alcoholates, amides, or hydrides can be used as alkaline condensing agents for the first production process above mentioned. The condensation is performed preferably in the presence of organic solvents such as for example methanol, ethanol, propanol, butanol, benzene, toluene, xylene, etc. and at a raised temperature, preferably between 80–140° C. In particular tertiary organic bases such as pyridine or dimethyl aniline, triethyl- and dimethyl- and also tributyl-amine in the presence or absence of additional organic solvents, such as e. g. diethyl- or di-isopropyl-ether, chloroform, dioxan, are suitable as acid binding agents for the second reaction named above. In this case, the ring is closed at low temperatures, preferably in the region of 0°.

Finally, instead of substituted malonic acid diesters or dihalides also substituted malonic acid monoester derivatives of the general formula:

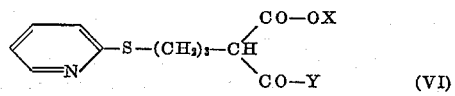
(VI)

can be used as starting materials. These can be condensed in a first step in the cold in the presence of an acid binding agent corresponding to the second above named production process to form the substituted malonic acid monoester monohydrazide and converted in the second step by means of alkaline condensation agents corresponding to the first production process into the desired end product of the Formula I. Sometimes, the ring is closed in the second step even at room temperature.

The substituted malonic acid diesters of the general Formula II necessary for the reaction are produced for example by condensing sodium malonic acid diesters with heterocyclic halogen alkylmercapto compounds of the general formula:

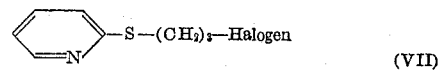
(VII)

or by reacting halogen alkyl malonic acid diesters of the general formula:

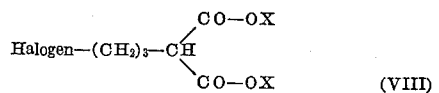
(VIII)

with alkali salts of a mercaptan of the formula

(IX)

Halogen propyl derivatives of the general Formula VII are also produced from the alkali salts of the mercaptan of Formula IX by reaction with 1.3-dibromopropane as well as with corresponding α-chloro-ω-bromalkanes or α.ω-dichloralkanes.

If the propylene alkylene bismercapto compound resulting from the reaction of the second halogen atom with a further molecule of the heterocyclic alkalimercaptide used become a considerable part of the reaction product, this can be reduced by the use of mixed dihalogen propane, e. g. 1-chloro-3-bromopropane. An alternative however, is to produce the halogen propylmercapto compounds in a two-step reaction process by first reacting the heterocyclic alkali mercaptides with halogen propanol, in particular with α.ω-halogen hydrins, and converting the hydroxypropylmercapto compounds obtained by treatment with inorganic acid halides, such as e. g. thionyl chloride or phosphorus tribromide, into the desired halogenpropylmercapto compound.

The new 1.2-diphenyl-3.5-dioxo-pyrazolidine is a colorless crystalline substance which dissolves easily both in the usual organic solvents and, because of the presence of an acid hydrogen atom, probably in the tautomeric enol form, also in diluted aqueous alkalies. Also the new compound forms salts with other inorganic as well as with organic bases.

In addition, the aqueous solutions of the alkali salts of the new compound have the property of promoting the solubility of pyrazole derivatives.

The following example further illustrates the production of the new compound. Parts are given as parts by weight and their relationship to parts by volume is as that of grammes to cubic centimetres.

*Example*

68 parts of (γ-pyridyl-(2)-mercapto-n-propyl)-malonic acid diethyl ester (B. P.$_{0.04}$=151–152°) are added to a solution of 5.1 parts of sodium in 150 parts by volume of abs. alcohol and then 40.5 parts of hydrazobenzene are added. The whole is then distilled until half the alcohol is distilled off, 75 parts by volume of abs. xylene are added and distillation is continued for a further 12 hours while keeping the temperature of the oil bath between 140 and 145°.

After cooling, 150 parts by volume of water are stirred in. When all the reaction products are dissolved, the layers are separated, the aqueous phase is shaken out twice with a little chloroform, the reaction is made acid to Congo red paper with 6 N-hydrochloric acid, the separated oil is taken up in ether, the ethereal solution is washed first with a little water and then with saturated sodium chloride solution, dried with anhydrous sodium sulphate and evaporated. The residue immediately crystallises out in the flask and can easily be recrystallised from 96% alcohol. 1.2-diphenyl-3.5-dioxo-4-[3'-(pyridyl-2''-mercapto)-n-propyl]-pyrazolidine so obtained melts at 127–128°.

What we claim is:

1.2 - diphenyl-3.5-dioxo-4-[3'-(pyridyl-2''-mercapto)-n-propyl]-pyrazolidine.

References Cited in the file of this patent

UNITED STATES PATENTS 2,700,671    Hafliger  ---------------- Jan. 25, 1955

FOREIGN PATENTS 506,891    Belgium  -------------- Nov. 30, 1951

OTHER REFERENCES

Zenne Chem. Abstracts, vol. 48, col. 11063 (1954).